United States Patent
Postelnik et al.

(10) Patent No.: US 10,270,886 B1
(45) Date of Patent: Apr. 23, 2019

(54) METHOD AND SYSTEM FOR DYNAMIC OPTIMIZATION OF A SCRIPT LIBRARY

(71) Applicant: CLOUDFLARE, INC., San Francisco, CA (US)

(72) Inventors: Igor Postelnik, San Francisco, CA (US); Dane Orion Knecht, San Francisco, CA (US); Oliver Zi-gang Yu, San Francisco, CA (US); John Fawcett, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 16/132,294

(22) Filed: Sep. 14, 2018

(51) Int. Cl.
*G06F 8/41* (2018.01)
*H04L 29/08* (2006.01)
*G06F 8/30* (2018.01)

(52) U.S. Cl.
CPC .............. *H04L 67/34* (2013.01); *G06F 8/315* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 9,436,449 | B1 * | 9/2016 | Chandnani | G06F 17/30902 |
| 2004/0064808 | A1 * | 4/2004 | Kira | G06F 8/443 |
| | | | | 717/154 |
| 2006/0143601 | A1 * | 6/2006 | Concha | G06F 8/61 |
| | | | | 717/170 |
| 2012/0317556 | A1 * | 12/2012 | Zhu | G06F 8/451 |
| | | | | 717/146 |
| 2013/0198713 | A1 * | 8/2013 | Zhang | G06F 8/10 |
| | | | | 717/106 |
| 2018/0048730 | A1 * | 2/2018 | Knecht | H04L 67/2828 |

(Continued)

OTHER PUBLICATIONS

Chishkala, Igor, "11 Tips to Optimize JavaScript and Improve Website Loading and Rendering Speeds", Upwork Global Inc., retrieved on Sep. 14, 2018 from https://www.upwork.com/hiring/development/11-tips-to-optimize-javascript-and-improve-website-loading-speeds/, Dec. 13, 2016, 10 pages.

(Continued)

*Primary Examiner* — Philip Wang
*Assistant Examiner* — Rongfa P Wang
(74) *Attorney, Agent, or Firm* — Nicholson De Vos Webster & Elliott LLP (57) ABSTRACT

A method and system for dynamically optimizing a script library are described. A request for a script library is received from a set of client devices. An instrumented version of the script library is transmitted to at least one of the set of client devices. The instrumented version of the script library includes code for tracing execution of the script library. Responsive to execution of the instrumented version of the script library at each one of the at least one of client devices, script library usage feedback indicative of usage of the script library at these client devices is received. An optimized version of the script library, generated based on the script library usage feedback by removing portions of the script library that are unused by the subset of client devices, is transmitted to the client device instead of the script library in response to a second request.

18 Claims, 7 Drawing Sheets

(56) References Cited

U.S. PATENT DOCUMENTS

2018/0375952 A1* 12/2018 Knecht .............. H04L 67/2842

OTHER PUBLICATIONS

Prince, Matthew, "CDNJS: The Fastest Javascript Repo on the Web", Cloudflare, Inc., retrieved on Sep. 14, 2018 from https://blog.cloudflare.com/cdnjs-the-fastest-javascript-repo-on-the-web/, Dec. 12, 2012, 5 pages.

"JSCompress—The JavaScript Compression Tool", JSCompress. com, retrieved on Sep. 14, 2018 from https://jscompress.com/, 2018, 1 page.

* cited by examiner

METHOD AND SYSTEM FOR DYNAMIC OPTIMIZATION OF A SCRIPT LIBRARY

TECHNICAL FIELD

Embodiments of the invention relate to the field of network services; and more specifically to a method and system for dynamic optimization of a script library.

BACKGROUND ART

There are several sets of script resources used across the web today. These sets of script resources are packaged in script libraries, such as JavaScript (JS) libraries (e.g., jQuery, Bootstrap, Backbone.js, and YUI, etc.), which underpin many of the existing network resources. A script library needs to be downloaded at a client device to allow for proper load of a network resource that uses the library. It is desirable to have the script libraries needed on the fastest connections possible. In addition, web application may cache the script libraries when downloaded enabling multiple network resources at different domains to use the same library. To enable the use of the library by multiple network resources, the network resources need to reference the same library via the same Uniform Resource Locator (URL).

A cloud-based proxy service can be used to offer a repository of script libraries that contain a wide range of script resources.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Throughout the following description similar reference numerals have been used to denote similar elements such as components, features of a system and/or operations performed in a system or element of the system, when applicable.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A cloud-based proxy service that includes a set of proxy servers can be used to serve one or more script libraries. The proxy servers can be distributed in multiple geographical areas remote from one another. However, each one of the script libraries can get very large including several script resources that may not be needed or used by all of the users of the script library. For example, some network resources of a first domain may not need the same resources of a script library as other network resources of a second domain. The download of these large libraries can result in slowing down the download of the network resources, a use of a large amount of memory resources at the client devices that download the library, and increases network usage.

The embodiments described herein provide a method and system for enabling the generation of optimized version(s) of a script library. The solutions presented herein reduce network usage between the proxy server serving the script library and the client devices requesting the library, speed up the loading of network resources that reference the script library at the client devices, and improve performance. Further, it enables the web applications storing the script library at the client devices to use a smaller memory footprint.

A method and system for dynamically optimizing a script library are described. In one embodiment, a request for a script library is received from each one of a set of one or more client devices. An instrumented version of the script library is transmitted to at least one of the set of client devices. The instrumented version of the script library includes code for tracing execution of the script library. As a result of the execution of the instrumented version of the script library at each one of the at least one of the set of client devices, script library usage feedback indicative of usage of the script library at the client devices is received. A second request for the script library is received from a client device.

An optimized version of the script library is transmitted to the client device instead of the script library. The optimized version of the script library is generated based on the script library usage feedback by removing portions of the script library that are unused by the subset of client devices.

Figure 1:
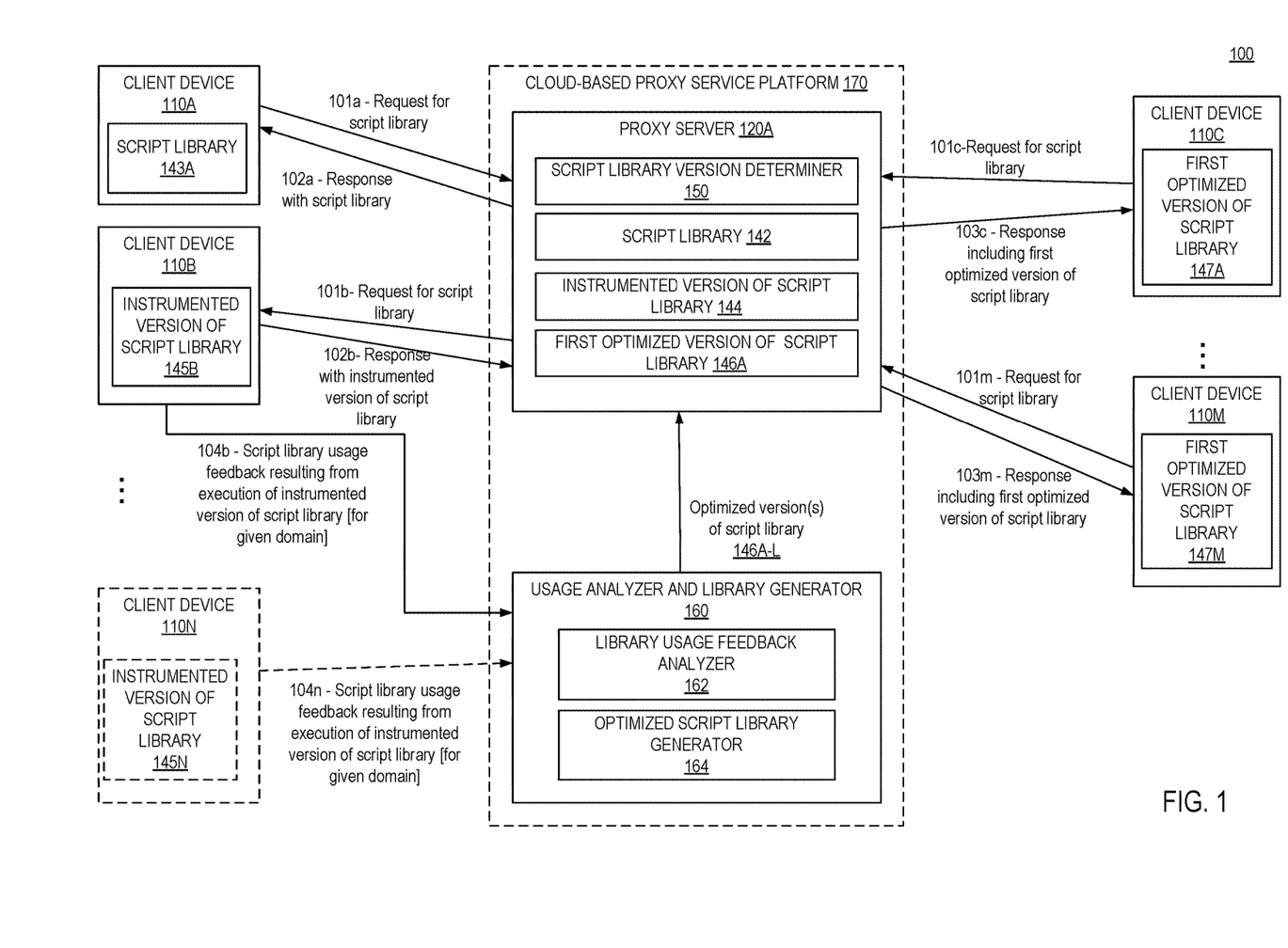
FIG. 1 illustrates a block diagram of an exemplary architecture for enabling dynamic optimization of a script library, in accordance with some embodiments.

FIG. 1 illustrates a block diagram of an exemplary architecture for enabling dynamic optimization of a script library according to one embodiment. The architecture 100 includes multiple client devices 110A, 110B, 110C, . . . 110N, . . . 110M, a proxy server 120A, and a usage analyzer and library generator 160. In some embodiments, both the proxy server 120A and the usage analyzer and library generator 160 are part of a cloud-based proxy service 170 and may run on the same or on different electronic devices that are owned by the same entity. In other embodiments, the proxy server 120A and the usage analyzer and library generator 160 are owned by different entities and are not part of the same cloud-based proxy service platform 170. In some of these embodiments, the proxy server 120A may be part of the cloud-based proxy platform 170 that is owned by a first entity and the usage analyzer and library generator 160 is owned by another entity different from the first entity. The cloud-based proxy service platform 170 includes a set of electronic devices that are used to offer the cloud-based proxy service owned by a first entity.

The client devices 110A, 110B, 110C, . . . 110N, . . . 110M can be referred to herein as a first set of client devices 110A-N and a second set of client devices 110C-110M. Each one of the client device 110A-N, and 110C-M is a computing device (e.g., laptop, workstation, smartphone, palm top, mobile phone, tablets, gaming system, set-top box, etc.) that is capable of accessing network resources (e.g., they include software such as client network applications (e.g., web browsers, mobile applications, etc.) that are capable of accessing network resources). In some embodiments, the client network applications are implemented based on web application program interfaces (APIs) enabling the client device to request access to resources hosted on a server. The client devices 110A-N and 110C-M are operative to request a script library. In some embodiments, the request for the script library results from the receipt of network resources at a client device in response to a previous request to access the network resources hosted at an origin server. In other embodiments, the request for the script library can be independent of a previous request for network resources but instead a request to download the script library for the web application running on the client device making the request. In the embodiments described herein the script library is served by a cloud-based proxy service as it will be described in further details below.

The proxy server 120A is one of a set of proxy servers (not illustrated in FIG. 1), where each one of the proxy servers is a computing device coupled with one or more client devices through a network (not illustrated). The proxy server 120A is part of a cloud-based proxy service which provides different services for customers (e.g., an owner of the script library 142). An owner of the script library can be an entity that includes a single or multiple developers that developed the script library and make it accessible through the cloud-based proxy service. The proxy server 120A is accessible to client devices (e.g., client devices 110A-N and client devices 110C-M) and serves one or more versions of a script library to the client devices. While FIG. 1 shows a single script library 142 with different version of this library (e.g., the instrumented version of the library 144, and optimized version of the script library 146A), in other embodiments multiple script libraries can be served by the proxy server 120A where multiple versions of each of these script libraries can be stored at the proxy server 120A.

In one embodiment, the proxy server 120A is a reverse proxy server. Certain network traffic is received and processed through the proxy server 120A. For example, web traffic (e.g., HTTP requests/responses, HTTPS requests/responses, SPDY requests/responses, etc.) for domains hosted on origin servers may be received and processed at the proxy server 120A. Further, requests for one or more script libraries can be received and processed at the proxy server 120A. In one embodiment, domain owners are customers of the cloud-based proxy service. In some embodiments, the cloud-based proxy server is used to serve one or more script libraries to client devices. A library is a collection of non-volatile resources used by computer programs, often for software development. These may include configuration data, documentation, help data, message templates, pre-written code and subroutines, classes, values or type specifications. A library is also a collection of implementations of behavior, written in terms of a language, that has a well-defined interface by which the behavior is invoked. The behavior is provided for reuse by multiple independent programs. A program invokes the library-provided behavior via a mechanism of the language. Library code is organized such that it can be used by multiple programs that have no connection to one another, in contrast with code that is part of a program that is organized to be used only within that one program. When a program invokes a library, it gains the behavior implemented inside that library without having to implement that behavior itself.

The script library 142 is a scripting language library. A scripting or script language is a programming language that supports scripts: programs written for a special run-time environment. Scripting languages are often interpreted (rather than compiled). Primitives are usually the elementary tasks or Application Programming Interface (API) calls, and the language allows them to be combined into more complex programs. Environments that can be automated through scripting include software applications, web pages within a web browser, usage of the shells of operating systems (OS), embedded systems, as well as numerous games. As a non-limiting example, the script library 142 can be a JavaScript library. Other examples of script libraries can be served by the cloud proxy server. In some of these embodiments, the script library can be an open source library and can be served by the cloud-based proxy server without any fees. The owner of the proxy server 120A is typically different than the owners of the resources or script libraries served by the proxy server. In addition, the proxy server 120A is not typically part of the local network of origin servers hosting the resources. For example, the proxy server 120A is outside of the local area network of the origin servers and is typically not physically accessible by the owner/administrator of an origin server.

By way of example, the cloud-based proxy service that includes the cloud-based proxy service platform 170, may provide services including protecting against Internet-based threats (e.g., proactively stopping botnets, cleaning viruses, trojans, and worms, etc.), providing performance services for customers (e.g., acting as a node in a content delivery network (CDN) and dynamically caching customer's files closer to visitors, page acceleration, content optimization services, etc.), TCP stack optimizations, and/or other services. In one embodiment, the cloud-based proxy service provides a service that enables the dynamic optimization and servicing of a script library.

Generally speaking, the proxy server 120A receives network traffic from the client devices 110A-N and 110A-M. In some embodiments, requests for the script library 142 are received at the proxy server 120A. The requests for the script library 142 may be received at the proxy server 120A as a result of previous requests from the client devices for network resources (e.g., a request to access a website which requires the use of resources from the script library). The network resources are typically hosted at origin servers (not shown) and the previous request for these resources may be either sent to the origin server or to a proxy server acting on behalf of the origin server. The proxy server 120A may receive requests for a script library (e.g., an HTTP GET request, or other requests for obtaining the script library 142 served by the proxy server 120A) from one of the client devices 110A-N or 110C-M.

The proxy server 120A analyzes incoming traffic and takes one or more actions on the incoming traffic. In some embodiments, incoming traffic is received at a particular server 120A as a result of a DNS request for a script library resolving to an IP address of the proxy server 120A. By way of example, DNS record(s) for the domain hosting the script library may resolve to an IP address of a server 120A. In some embodiments, multiple script libraries that may be owned by different owners/developers may resolve to the same server 120A (e.g., the same IP address or a different IP address of the proxy server 120A).

In some embodiments, the script library owner/administrator is a customer of a cloud-based service and registers the script library for the service. For example, the authoritative name servers for the script library may be changed to the authoritative name server of the service. It should be understood that the backup authoritative name server serving the script library may also be changed to an authoritative name server of the service. The zone file record for the script library is also changed such that DNS resolution requests for the script library resolve to the proxy server 120A.

The usage analyzer and library generator 160 is an electronic device coupled with one or more of the client devices 110A-N and 110C-M and with the proxy server 120A through a network (not illustrated). The usage analyzer and library generator 160 is operative to receive script library usage feedback from the client devices, to analyze the feedback and to generate one or more optimized versions (146A-L) of the script library 142. In some embodiments, the usage analyzer and library generator 160 is part of the cloud-based proxy service which provides the different services to customers. In other embodiments, the usage analyzer and library generator 160 is not part of the cloud-based proxy service and can be owned by another entity.

In some embodiments, a service server that is an electronic device operated by the cloud-based proxy service, can provide a set of tools and interfaces for the customer of the cloud-based proxy server for configuring the service offered and is accessible over the Internet. For example, the service server, among other things, allows the customer to register for the service, view statistics/logs of events, and report suspicious events. The service server includes tools to assist the customer in changing their authoritative name servers and zone file record. It should be understood, however, that the customer may change their authoritative name server and zone file without use of the service server (i.e., they may directly change the authoritative name server and zone file).

While FIG. 1 illustrates a single proxy server 120A, in some embodiments the cloud-proxy service has multiple proxy servers that are geographically distributed. For example, in some embodiments, the service uses multiple point of presences (POPs). A POP is a collection of networking equipments (e.g., authoritative name servers and proxy servers) that are geographically distributed to decrease the distance between requesting client devices and content. The authoritative name servers have the same anycast IP address and the proxy servers have the same anycast IP address. As a result, when a DNS request is made, the network transmits the DNS request to the closest authoritative name server. That authoritative name server then responds with a proxy server within that POP. Accordingly, a visitor will be bound to that proxy server until the next DNS resolution for the requested domain (according to the TTL (time to live) value as provided by the authoritative name server). In some embodiments, instead of using an anycast mechanism, embodiments use a geographical load balancer to route traffic to the nearest POP.

In some embodiments, the proxy server 120A receives one or more requests (e.g., an HTTP GET request, or other request) for a script library 142 served by the proxy server 120A. The client device 110A makes a request 101*a* for a script library, which is transmitted to the proxy server 120A. The proxy server 120A analyzes the request 101*a* and transmits a response 102*a* to the client device 110A. The response 102*a* includes a copy of the script library 142. The script library 142 can be referred to as the initial script library. In some implementations the script library 142 is the entire code of a complete script library as initially generated or written by the owner(s) of the library. In some other implementations, the script library 142 is already an optimized version of the complete script library as it was originally generated/written by the owners of the library. This optimized version is capable of being further modified such that one or more optimized versions can be generated from it. The copy of the script library is stored (as script library 143A) on the client device 110 to be used for loading one or more network resources.

The client device 110B makes a request 101*b* for the same script library, which is transmitted to the proxy server 120A. The proxy server 120A analyzes the request 101*b* and transmits a response 102*b* to the client device 110A. The response 102*b* includes an instrumented version of the script library 144. The instrumented version of the script library 144 includes code for tracing execution of the script library 142. The instrumented version of the script library allows for monitoring or measuring the execution of the code of the script library 142. Instrumentation is implemented in the form of code instructions that monitor multiple components of the script library. For example, the instrumentation allows to monitor which functions or code of the script library is called by a client device (e.g., client device 110B or client device 110N that received the instrumented version of the script library). One or more additional client devices (e.g., client device 110N) can receive upon transmission of a request for the script library a copy of the instrumented version of the script library 144. In some embodiments, the instrumented version of the script library 144 is generated by the cloud-based proxy service. The initial script library source files can be rewritten to replace each function of this initial script library with one that traces usage and then calls the original function of the initial library. In some implementations, the tracing is minimal as for each function of the initial library a single bit is recorded per function, indicating whether the function was called or not. In other implementations, additional information can be recorded during the tracing process, such that the time at which the function was called, the geographic location of the client device, and/or the domain for which the library is being used. Additional information can be tracked without departing from the scope of the present embodiments. In some embodiments, the instrumented version of the script library may include code for monitoring execution of all code of the initial library. In other embodiments, the instrumented version includes code for monitoring execution of a subset of the code of the initial library. For example, the initial library may include code that is known to be used regularly by applications using the library and do not need to be monitored, in this case these functions may not need to be traced. While FIG. 1 illustrates a single instrumented version of the script library 144 stored in the proxy server 120A, in some embodiments, the proxy server 120A may store multiple instrumented versions. In this embodiment, the client devices 110A-N making a request for the script library may receive one version from the multiple instrumented versions of the script library. The multiple instrumented versions may be used to track different portions of the script library and may be transmitted to different client devices based on several criteria. The criteria may include location, time, and/or the network resources for which the script library is needed.

In some embodiments, the transmission of copies of the instrumented version of the script library can be performed during a predetermined period of time. For example, the proxy server 120A is operative to transmit during a period of the day instrumented versions of the script library to client devices and transmit initial versions of the script library during the remaining time in the day. In some embodiments, this period of time can be a predetermined period of time defined by the cloud-based proxy server. In other embodiments, the period of time can be set by the owner(s) of the script library. In some embodiments, the transmission of instrumented versions of the script library can be performed regularly at the proxy server 120A to allow for regular updates of the optimized versions of the script library by the usage analyzer and library generator 160.

The usage analyzer and library generator 160 is operative to receive library usage feedback for a given period of time during which the instrumented version of the script library is executed by the client devices that received it. The usage analyzer and library generator 160 receives and analyzes the script library usage feedback to generate optimized versions of the script library. For example, the usage analyzer and library generator 160 can receive feedback during a predetermined period of time that can be multiple seconds, minutes, hours, to multiple days during which the instrumented version of the script library is executed at the client devices.

In some embodiments, upon receipt of requests for the script library, the proxy server 120A may determine for each client device whether to transmit a copy of the script library (initial version) or a copy of an instrumented version. For example, the proxy server 120A determines to transmit a copy of the script library 143A to client device 110A and determine to transmit a copy of the instrumented version of the script library 145B to client device 110B. In these embodiments, upon receipt of multiple requests from multiple client devices (e.g., client devices 110A-N) for the script library during an interval of time, the proxy server 120A, through the script library version determiner 150, determines at least one client device that is to receive an instrumented version. For example, the script library version determiner 150 may determine that a subset of the requests received from a set of client devices is to receive as responses the instrumented version of the script library, where the subset is strictly less than the entire set of client devices transmitting requests for the script library during that interval of time. For example, in some implementations a fraction of the client devices, which transmit requests to the proxy server 120A at a given time, are to receive instrumented versions of the script library. This process may be repeated until it is determined that sufficient information is gathered at the usage analyzer and library generator 160 for determining which portions of the script library are used by the client devices. In one non-limiting example, the proxy server 120A may transmit an instrumented version of the script library to all client devices transmitting requests for the script library during a given time of the day (e.g., from 2 PM to 3 PM) and transmit an initial version of the script library to client devices requesting the library at other times during the day. In another non-limiting example, the proxy server 120A may transmit the instrumented version of the script library to a subset that is strictly less that all the client devices from which requests are received at a given time (e.g., 1 out N client devices with requests received at a time Ti are to receive the instrumented version of the script library).

The receipt of the instrumented version of the script library (e.g., 145B, 145N) causes the respective client device, e.g., client device 110B and client device 110N, to generate and transmit script library usage feedback to the usage analyzer and library generator 160. The script library usage feedback results from execution of the instrumented version of the script library. In some embodiments, the usage analyzer and library generator 160 receives script library usage feedback from each one of the client devices that received the instrumented version of the library. In some embodiments, each client device periodically transmits the script library usage feedback (e.g., every N minutes). For example, when the client device is used to view web resources, each page view that involves a call to the instrumented library can generate one or more events. The events can be recorded at the client device and transmitted to the usage analyzer and library generator 160 at regular intervals (e.g., every N seconds, every N minutes, every N hours, etc.). In other embodiments, the events can be transmitted to the usage analyzer and library generator 160 when they occur. In some implementations, in addition to including information indicating the code (e.g., function) from the script library that is called, each event may also include other information, such as page URL of the internet resource that caused the call to the script library, the web application type and version (e.g., browser type and version of the browser) that was used for accessing the network resource on the client device, the geographical location of the client device, the date and/or time of day at which the event occurred, etc.

The usage analyzer and library generator 160 receives the script library usage feedback (e.g., 104*b*, and/or 104*n*) resulting from the execution of instrumented versions of the script library at one or more of the client devices 110A-N. The script library usage feedback is indicative of portions of the initial script library 142 that are used by each one of the client devices that has received instrumented versions of the library, e.g., client device 110B and client device 110N. The script library usage feedback 104*b* indicates events recorded when the script library is called at the client device 110B during a predetermined period of time. The script library usage feedback 104*m* indicates events recorded when the script library is called at the client device 110M during another predetermined period of time. In some implementations, the usage feedback can be received from different client devices (e.g., 110*b*, and 110*m*) during the same predetermined period of time. Alternatively, each usage feedback is received during a different period of time. For example, the script library usage feedback may include a list of functions from the script library that were called by the client device (e.g., by a web application running on the client device) during a predetermined period of time. While only two client devices are illustrated as providing usage feedback to the usage analyzer and library generator 160, more than two client devices can receive the instrumented version of the script library and transmit as the result of its usage the feedback. When the script library usage feedback is received regularly, the multiple feedbacks received may be for multiple predetermined period of times for each client device.

In some embodiments, the script library usage feedback is analyzed by the library usage feedback analyzer 162 to determine portions (e.g., functions) of the initial script library 142 that were unused by any of the client devices during the predetermined period of time. For example, a comparison between the initial script library and the portions of the library used by one or multiple client devices is performed by the library usage feedback analyzer 162 to determine and extract the portions of the script library that were not used during the predetermined period of time during which the monitoring of the execution of the script library was performed. The optimized script library generator 164 generates as a result of the analysis of the script library usage feedback one or more optimized version(s) of the script library 146A-L that are to be transmitted to the proxy server 120A. Each of one the optimized versions of the script library can be generated by removing unused code from the initial library as determined by the analysis of the feedback or alternatively by generating a new version of the library which includes only code that is used by the client devices. In some embodiments, the unused code is replaced with code that makes a call to the script library such that if a client device that received optimized versions of the script library may use code from the script library that is not included in the optimized version of the script library if needed.

In some embodiments, the generation of the optimized version of the script library is performed by replacing in the script library the portions of the script library that are unused with one or more stubs. A stub substitutes the unused code. The substitution of the original code of the initial library with stubs enable the optimized version of the script library to be smaller in size than the initial version of the script library. Each one of the optimized versions is smaller in size than the initial version of the script library allowing for a more efficient distribution and usage of the script library. In some embodiments, a call to the stub by a client device may result in no action or operation to be performed. In other embodiments, a call to the stub by a client device may cause the initial script library to be loaded.

Once the one or more optimized versions of the script library, e.g., the first optimized version of the script library 146A, are generated, they are transmitted to one or more client devices, e.g., client device 110C-M upon receipt of a request for the script library. The client device 110C makes a request 101*c* for the same script library, which is transmitted to the proxy server 120A. The proxy server 120A analyzes the request 101*c*, e.g., through the script library version determiner 150, and transmits a response 103*c* to the client device 110A. The response 103*c* includes a copy of the optimized version of the script library 146A instead of a copy of the script library 142 or the instrumented version of the script library 144. The client device 110M makes a request 101*m* for the same script library, which is transmitted to the proxy server 120A. The proxy server 120A analyzes the request 101*m* and transmits a response 103*m* to the client device 110A. The response 103*m* includes a copy of the same optimized version of the script library 146A instead of a copy of the script library 142 or the instrumented version of the script library 144. In some implementations, the script library version determiner 150 may determine which version is to be transmitted to the client device making the request to determine whether the optimized version of the script library 146A is the version to be transmitted.

Upon receipt of a copy of the first optimized version of the script library the client devices may use this version of the library for one or more network resources accessed by users of the client devices 110C-M. In some embodiments, the optimized version of the script library is sufficient and allows the network resources to be properly accessed. In some embodiments, a network resource may need some portion of the unused code of the script library that is not included in the optimized version of the script library. In these embodiments, a call to the first optimized version of the script library can result in a new request for the script library. For example, when unused portion of the code of the script library is replaced with stubs, these stubs can include a call to the initial script library, such that when they are called, they cause the initial script library to be transmitted to the client device.

The embodiments described herein provide a method and system for enabling the generation of optimized version of a script library. The embodiments presented herein decrease network usage between the proxy server serving the script library and the client devices requesting the library, speed up the loading at the client devices of network resources that reference the script library, and improve performance. The use of optimized versions of the script library instead of the initial/original script library also allows for a smaller memory footprint at the client device. For example, the web application running on the client device storing the optimized version of the script library uses a smaller memory footprint than when it stores the initial/original script library.

Figure 2A:
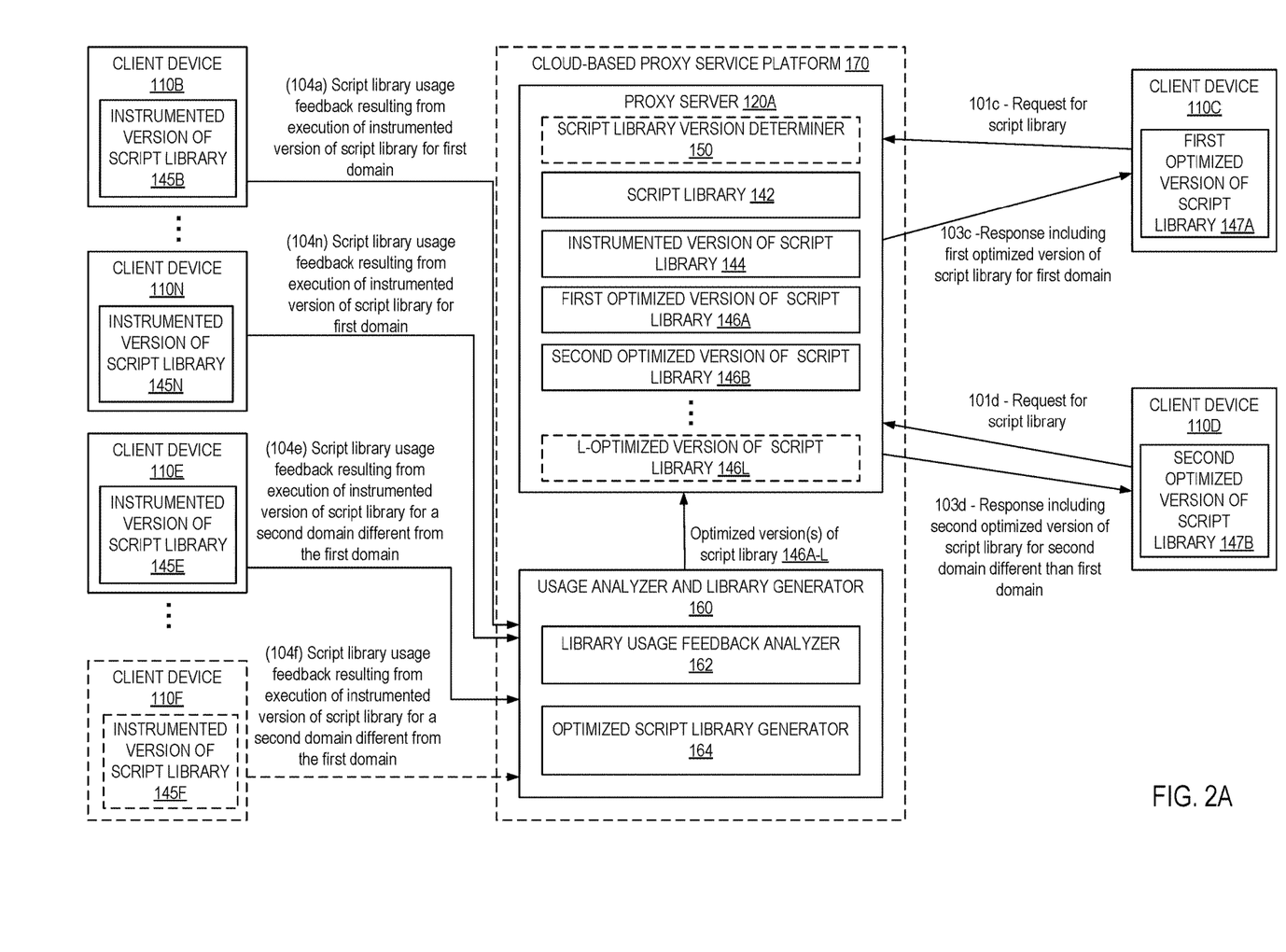
FIG. 2A illustrates a block diagram of an exemplary system in which different optimized versions of a script library are transmitted from a proxy server to multiple client devices in response to a request for a script library, in accordance with some embodiments.

FIG. 2A illustrates a block diagram of an exemplary system in which different optimized versions of a script library are transmitted from a proxy server to multiple client devices in response to a request for a script library in accordance with some embodiments. While FIG. 1 illustrates a single optimized version of script library 146A transmitted to a first client device 110C and a second client device 110M, in other implementations different optimized versions of the script library can be transmitted to different client devices as described with reference to FIG. 2A. For example, the usage analyzer and library generator 160 may generate multiple optimized versions of the script library 146A-L. In one embodiment, the first version of the script library 146A is generated based on feedback received from execution of instrumented versions of the script library (e.g., 145B, . . . , 145N) at one or more client devices 110B-N, when these client devices are accessing a first domain. The script library usage feedback, e.g., 104*b*, 104*n*, is indicative of the usage of the library when a user is accessing network resources at the first domain. For example, when a user accesses a first domain "example.com" which makes calls to a script library, any calls to the script library are traced and feedback is transmitted to the usage analyzer and library generator 160. In some embodiments, the usage analyzer and version library 160 may receive from each client device an indication of which network resource is requesting execution of the script library. This is used in combination with the feedback to generate the optimized version for the network resource, e.g., for the first domain. In other embodiments, the feedback received as the result of execution of the instrumented version of the script library includes an indication of which network resource is making calls to the library.

In one embodiment, a second optimized version of the script library 146B is generated upon receipt of feedback from a second set of client devices 110E-F when these client devices execute instrumented versions of the script library, 145E-145F, when accessing network resources at one or more other domains that are different from the first domain. Thus, the second optimized version of the script library 146B is generated based on feedback for multiple domains (websites) in contrast to the first script library generated based on feedback for a single domain.

Once the multiple optimized versions of the script library are generated, they are transmitted to the proxy server 120A and used when new requests for the script library are received from client devices. For example, when client device 110C is used to access a network resource at the first domain and a request 101c for the script library is made from client device 110C, the proxy server 120A transmits in response to the request 101c, the first optimized version of the script library in the response 103c. The first optimized version of the script library is used to properly access network resources at the first domain. Alternatively, when a request for the script library is received from client device 110D, which is accessing a network resource at a second domain different than the first domain, the second optimized version of the script library is transmitted in the response 103d instead. The second optimized version of the script library is used to properly access network resources at the second domain. While only two client devices are illustrated, client devices 110C and 110D, this is intended to be exemplary only and, in some embodiments, a different number of client devices can make requests for a script library and receive from the proxy server 120A one or more optimized versions of the script library.

In some embodiments, while a first optimized version of the script library is determined by the usage analyzer and library generator 160 for a first domain, this first optimized version is determined for that domain for a given period of time, a given version of the network resources of the first domain, and for a given version of the script library that is initially available at the proxy server 120 prior to optimization. The network resources of the first domain may change over time causing the first optimized version of the script library to no longer be appropriate for the first domain. For example, the network resources of the first domain may need a call to code (e.g., a new method or function) that is not in the first optimized version of the script library. This code may have been in the initial script library or alternatively may be new and may not have been present in the initial script library.

When the code is initially present in the script library, the optimized version of the script may include a call to the initial script library instead of the code. In this case, this call causes the script library to be requested from the proxy server 120A when the code is called. For example, a stub replacing the unused code in the optimized version of the script library includes a call for the initial script library.

When the code is new and is not initially present in the script library several mechanisms can be used to enable the client devices including the first optimized version of the script library to correctly process the network resources for the first domain when the first optimized version of the script library does not include the code. In one embodiment, the cloud-based proxy service is operative to allow the owner of script library to inform the service that an update to the script library has occurred. For example, the cloud-based proxy service may provide an API that allows the owners of the script library to indicate that the script library has changed. Upon determination that the script library has changed, the proxy servers are caused to discard the one or more optimized versions of the script library generated for the multiple domains (e.g., discard the first optimized version of the script library generated for the first domain) and determine updated optimized versions of the script library for the domains by restarting the profiling mechanism for the updated script library. The profiling mechanism includes transmitting instrumented versions of the script library to one or more client devices, receiving feedback as a result of execution of the instrumented version of the script library, analyzing the usage feedback and generating one or more updated optimized versions of the script library for one or multiple domains. The one or more updated versions of the script library are adapted to the new content of the script library for the first domain.

In another embodiment, the cloud-based proxy service platform may automatically detect when content of the script library changes. For example, the cloud-based proxy service platform (through one or more proxy servers) may ping the owner of the script library at regular intervals to obtain the current version of the script library and determine whether the current version is an updated version when compared to the one cached at the proxy servers. When it is determined that the current version is an updated version, the proxy servers are caused to discard one or more optimized versions of the script library generated for the multiple domains (e.g., discard the first optimized version of the script library generated for the first domain) and determine updated optimized versions of the script library for the domains by restarting the profiling mechanism for the updated script library. The profiling mechanism includes transmitting instrumented versions of the script library to one or more client devices, receiving feedback as a result of execution of the instrumented version of the script library, analyzing the usage feedback and generating one or more updated optimized versions of the script library for one or multiple domains. The one or more updated versions of the script library are adapted to the new content of the script library for the one or multiple domains for which they are generated.

Figure 2B:
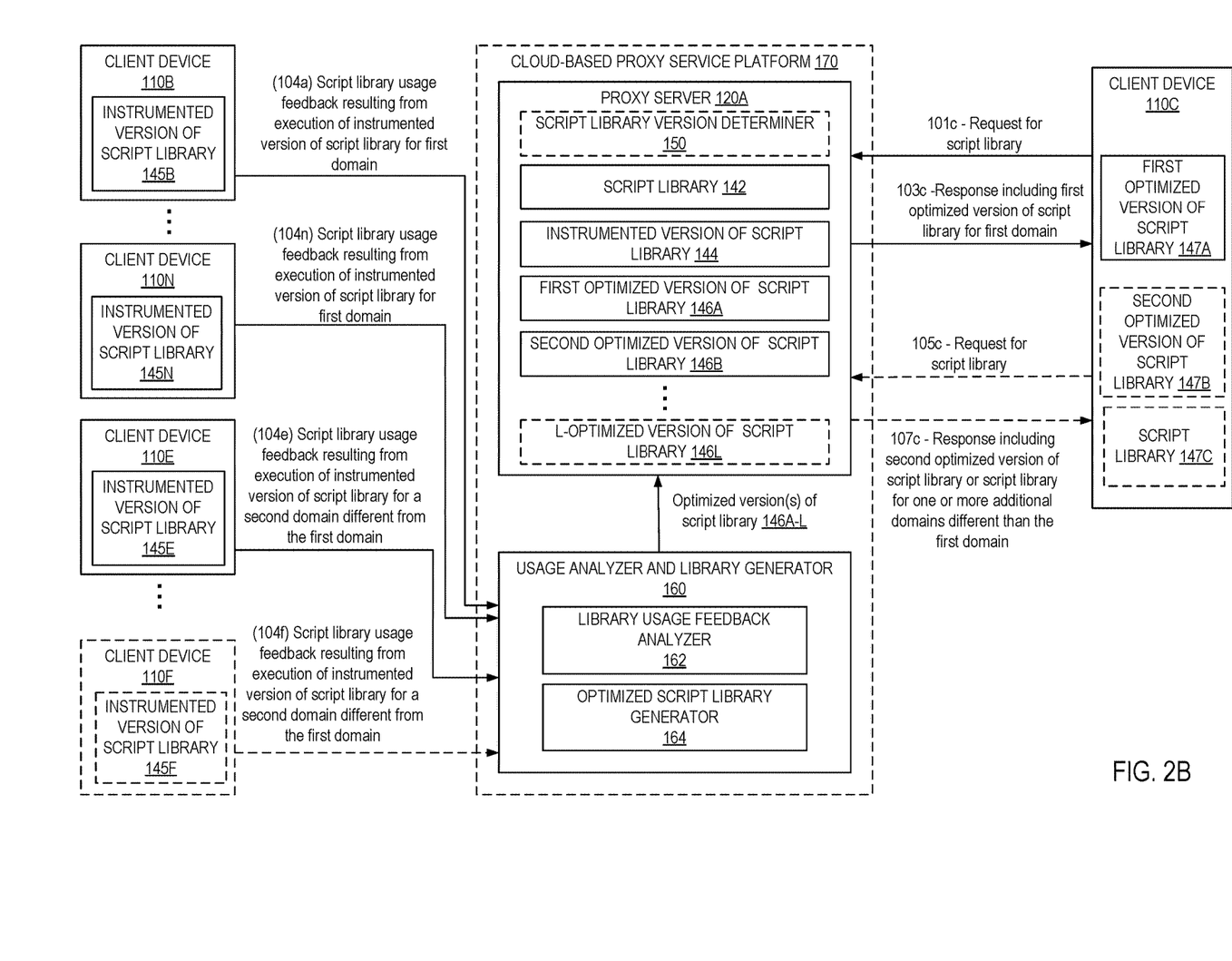
FIG. 2B illustrates a block diagram of an exemplary system in which different optimized versions of a script library are transmitted from a proxy server to a single client device in response to requests for a script library, in accordance with some embodiments.

FIG. 2B illustrates a block diagram of an exemplary system in which different optimized versions of a script library are transmitted from a proxy server to a single client device in response to requests for a script library, in accordance with some embodiments. In some embodiments, client device 110C may be used to access network resources at different domains. The proxy server 120A includes several optimized script libraries and each optimized version of the script library is used when one or more domains are accessed by the client device 110C. In this embodiment, the client device 110C may be required to have access to more than one script library in order to provide adequate access to the various network resources on the multiple domains. For example, when the client device 110C is used to access network resources at a first domain, the client device 110C makes a first request 101c for the script library, as described above upon determination that the request for the script library is a result of accessing the first domain and that the first optimized version of the script library was generated for use with the first domain, the proxy server 120A transmits a copy of the first optimized version of the script library 147A.

The client device 110C receives in the response 103c, the first optimized version of the script library and uses it when the first domain is accessed.

In one embodiment, the client device 110C is further used to access network resources at one or more additional domains that are different from the first domain. When accessing these network resources, the client device 110C may need to make calls to the script library. The client device 110C makes calls to the first optimized version of the script library as already stored on the client device 110C. In some embodiments, a call to the first optimized version of the script library can result in a new request for the script library 105c. For example, the call to the first optimized version of the script library 147A may be a call to a function that is not included in the first optimized version of the script as it is not used when the first domain is accessed. This function can be replaced with a stub and when accessed makes a call to the initial script library.

In some embodiments, upon receipt of the request 105c, the proxy server 120A may determine if a copy of the initial script library is to be transmitted to the client device 110C or alternatively if a copy of another optimized version of the script library can instead be transmitted. For example, the proxy server 120A may determine that the script library request is associated with access to a second domain for which a second optimized version of the script library was generated. In this case the response 107c may include the second optimized version of the script library. Thus, in these embodiments, the client device 110C may include two or more versions of the script library. In some embodiments, the client device 110C may store only a single version of the library and upon receipt of a new version of the library it may remove the previously stored version of the library. For example, if the response 107c includes the initial version of the script library, which is typically a more complete version of the script library, the client device 110C may remove the first optimized version of the script library and may use the script library 147C for all network resources at all domains. In other embodiments, the client device 110C may store the different optimized versions of the script library (e.g., 147A, 147B) and may use each one with network resources at respective domains.

Multiple optimized versions of the script library can be generated (e.g., a version per site/domain). In some implementations, a limited number of optimized versions can be generated such that client devices accessing multiple sites can use the same optimized version of script library, which allows the client devices to not download several versions of the script library. For example, a library would be generated for a collection of sites that are likely to be visited by client devices and this version is transmitted to these client devices. The usage analyzer and library generator 160 may determine an optimum number of optimized versions that minimizes a total number of downloads for the client devices. In some embodiments, a custom optimized version can be generated for a specific high-volume domain, and few common optimized versions can be generated for low-volume domains.

Figure 3:
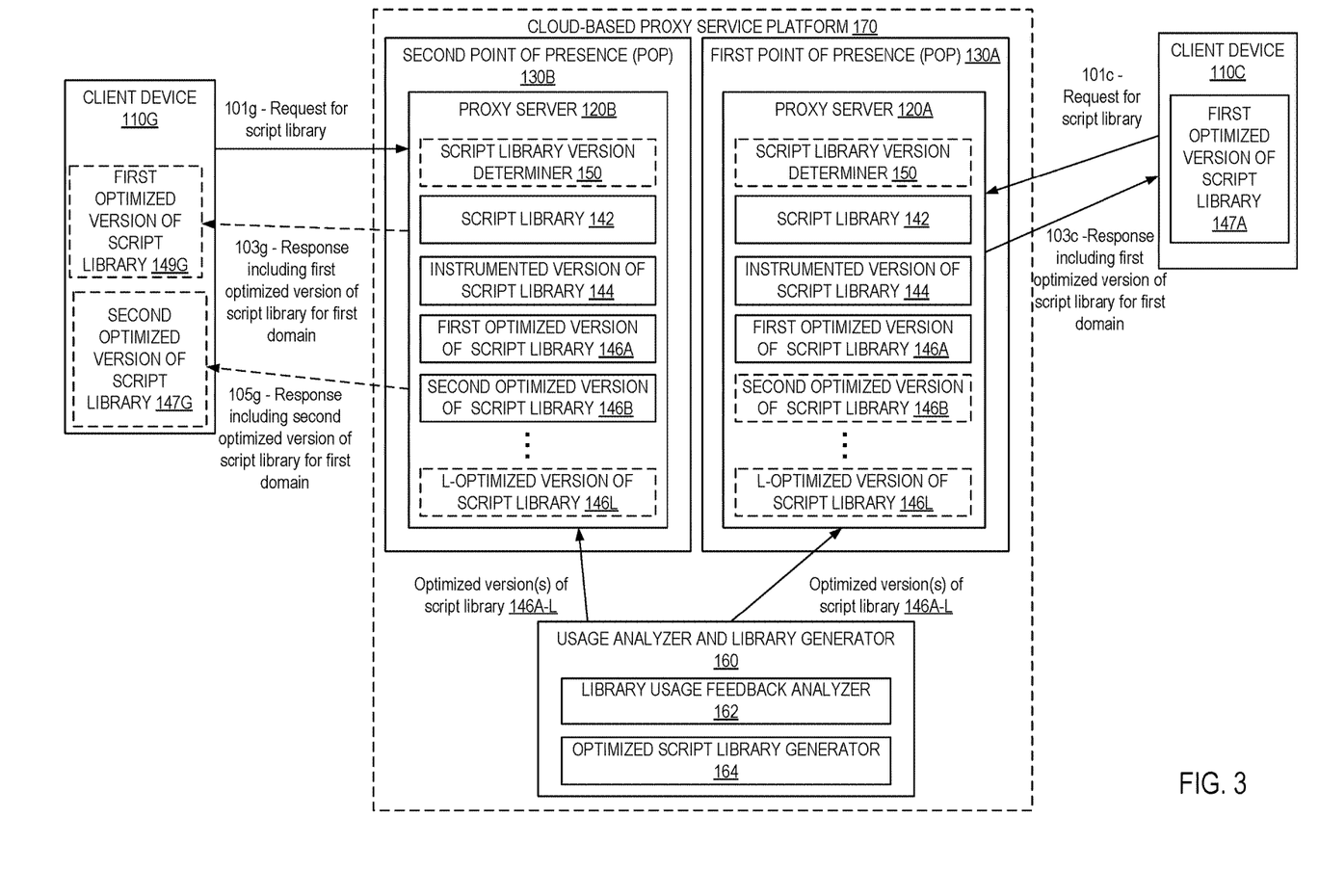
FIG. 3 illustrates a block diagram of an exemplary system in which different optimized versions of a script library are transmitted from multiple proxy servers to multiple client devices in response to a request for a script library in accordance with some embodiments.

FIG. 3 illustrates a block diagram of an exemplary system in which different optimized versions of a script library are transmitted from multiple proxy servers to multiple client devices in response to a request for a script library in accordance with some embodiments.

In some embodiments, the cloud-based proxy service uses multiple point of presences (POPs). FIG. 3 illustrates an example of such embodiments, where the cloud-based proxy service platform 170 includes a first POP 130A and a second POP 130B. The proxy server 120A is a first proxy server part of a first POP 130A located at a first geographical location and the proxy server 120B is a second proxy server part of a second POP 130B that is located at a second geographical location that is remote from the first geographical location. While a single proxy server is illustrated for each POP, additional proxy servers may be included in each one of the POPs. In some of these embodiments, each of the proxy servers may include one or more of the optimized versions of the script library 146A-L. The proxy servers 120A and 120B may operate as described with embodiments of the FIGS. 1-2B with respect to the generation of the optimized versions of the script library.

The proxy servers 120A and 120B may include the same set of optimized versions of script libraries in addition to the script library 142 and to the instrumented version of script library 144 and. In other embodiments, each of the proxy servers 120A and 120B may include a subset of the optimized versions of the script libraries where the first subset stored in the first proxy server 120A is different from the second set of optimized versions of the script libraries stored on the second proxy server 120B. In some embodiments, different client devices making requests for the script library while a first domain is being accessed may be directed towards different proxy servers in different POPs. For example, client device 110C is directed towards the first proxy server 120A in POP 130A when making the first request 101c. Client device 110G is directed towards proxy server 120B in POP 130B when making the request 101g for the script library. In both cases the request result from a user accessing network resources at the same first domain.

In some embodiments, a response 103c is transmitted to the client device 110C including the first optimized version of the script library generated for the first domain. In some embodiments, the same version can also be transmitted in the response 103g transmitted to the client device 110G in response to the request 101g. for the script library alternatively, in some embodiments, a different version can be transmitted in the response 105g. In this alternative embodiment, while the network resources accessed with client device 110C and client device 110G are network resources of the same first domain, each of the POP may have a different version of the script library associated with that domain resulting in client device 110C receiving a first version of the library in the response 103c and client device 110G receiving a different version of the library in the response 105g. While in this example, the different versions of the libraries transmitted to each one of the client device 110C and client device 110G is an optimized version of the script library (e.g., first optimized version and the second optimized version) the invention is not so limited and other different versions can be transmitted. For example, in one case the client device 110C may receive an optimized version, while the client device 110G may receive the initial or complete script library or an instrumented version of the script library.

In some embodiments, the generation of the optimized versions of the libraries can be performed based on feedback received from proxy servers in different POPs, alternatively or additionally, the generation of the optimized versions based on feedback per POP such that feedback received from client devices associated with a first POP is only used to determine optimized versions for that particular POP, and feedback received from client devices associated with a second POP, different from the first POP, is only used to determine optimized versions for proxy servers of that second POP.

The operations in the flow diagrams below will be described with reference to the exemplary embodiments of the FIGS. 1-3. However, it should be understood that the operations of the flow diagrams can be performed by embodiments of the invention other than those discussed with reference to the other figures, and the embodiments of the invention discussed with reference to FIGS. 1-3 can perform operations different than those discussed with reference to the flow diagram.

Figure 4:
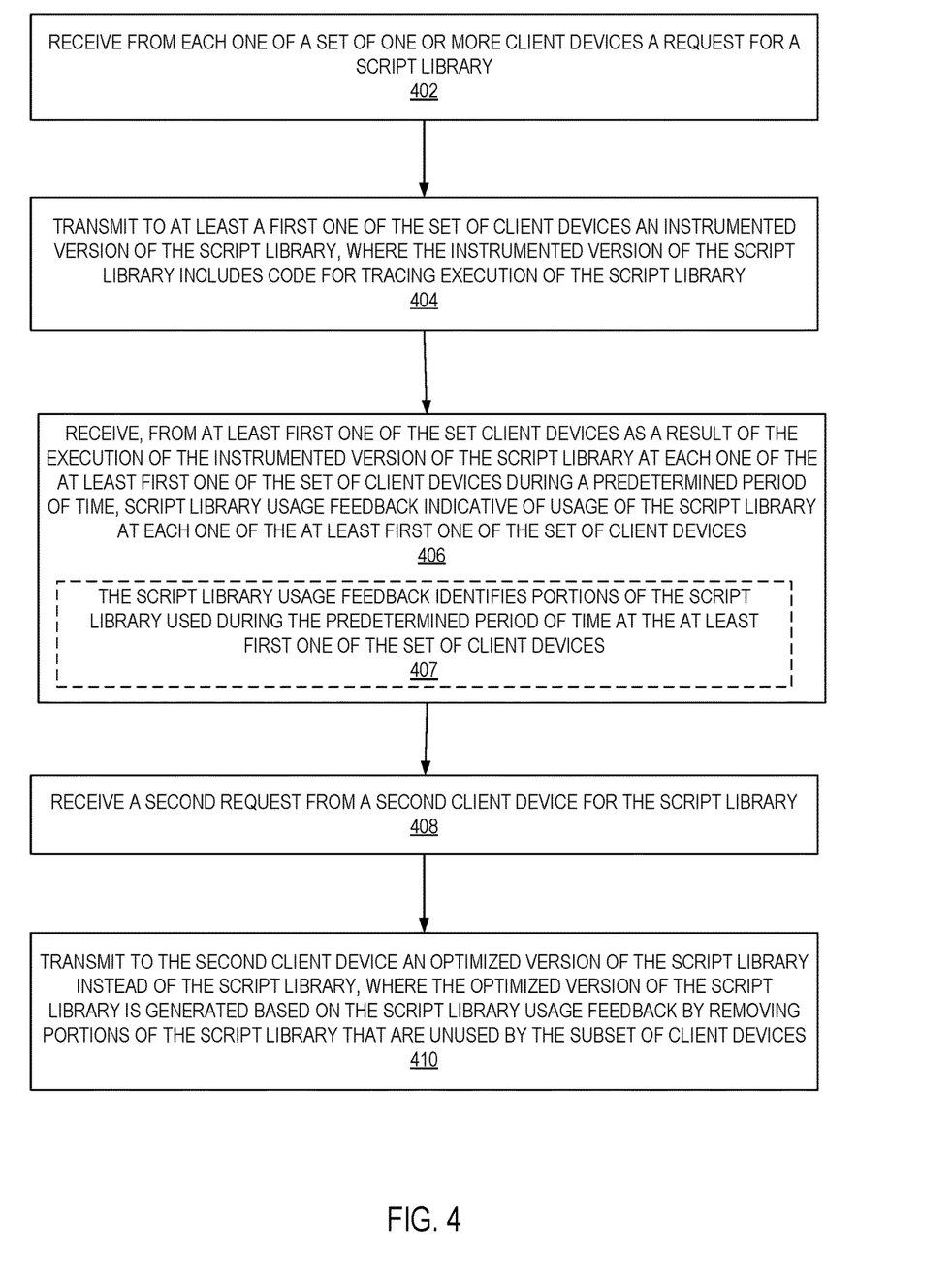
FIG. 4 illustrates a flow diagram of exemplary operations for enabling dynamic optimization of a script library, in accordance with some embodiments.

FIG. 4 illustrates a flow diagram of exemplary operations for enabling dynamic optimization of a script library, in accordance with some embodiments. At operation 402, a request for a script library is received from each one of a set of one or more client devices. For example, the proxy server 120A receives one or more requests from client devices 110A-N. At operation 404, an instrumented version of a script library is transmitted to at least a first one of the set of client devices. Proxy server 120A transmits to client devices 110B-N a copy of the instrumented version of the script library 144. The instrumented version of the script library includes code for tracing execution of a script library 142. In some embodiments, the instrumented version of the script library includes the script library with additional code that allows to monitor the execution of the script library and obtain feedback regarding the usage of the script library during a predetermined period of time.

In some embodiments, the at least first one of the set of client devices is one of a subset of client devices that are to receive instrumented versions of the script library. In some embodiments, the subset is strictly less than the set of client devices. In other embodiments, the subset includes all of the client devices that transmit requests for the script library to the proxy server during a predetermined interval of time. In some embodiments, the proxy server 120A determines the subset of client devices from the set of client devices that are to receive the instrumented version of the script library. Several mechanisms can be used to select the subset of client devices. For example, the proxy server 120A may select a time period during the day during which all requests received for the script library are to receive the instrumented version of the script library, while requests received at other periods of that day are to receive the initial script library. In other examples, the proxy server 120A may select a fraction of the client devices that send a request at a given time (for example, in a given minute) to be part of the subset of client devices and to receive the instrumented version of the script library instead of the initial version of the script library. In all of these embodiments, the instrumented version of the script is transmitted to each one of the subset of client devices, and the script library usage feedback is indicative of usage of the script library at each one of the subset of client devices. Further the receipt of the script library usage feedback is a result of the execution of the instrumented version of the script library at each one of the subset of client devices during the predetermined period of time At operation 406, as a result of the execution of the instrumented version of the script library at each one of the at least one of the set of client devices, script library usage feedback indicative of usage of the script library at each one of the at least one of the set client device during the predetermined period of time is received from the client device(s). In some embodiments, the script library usage feedback identifies portions of the script library used during a period of time at each client device from the subset of client devices. The script library usage feedback may further include an indication of the time and day at which the calls for the script library are recorded, the URL of the network resources causing the script library to be called, the geographical location of the client device requesting the script library. Other information can be included in the script library usage feedback such as the type of web application running on the client device, the version of the web application, and other information without departing from the scope of the present invention.

Flow then moves to operations 408, at which a second request for the script library is received from a client device. For example, a request is received from client device 110C. At operation 410, an optimized version of the script library is transmitted to the client device instead of the script library. The optimized version of the script library is generated based on the script library usage feedback by removing portions of the script library that are unused by the subset of client devices. In some embodiments, the generation of the script library is performed as described with reference to FIG. 1-3, and FIG. 5.

Figure 5:
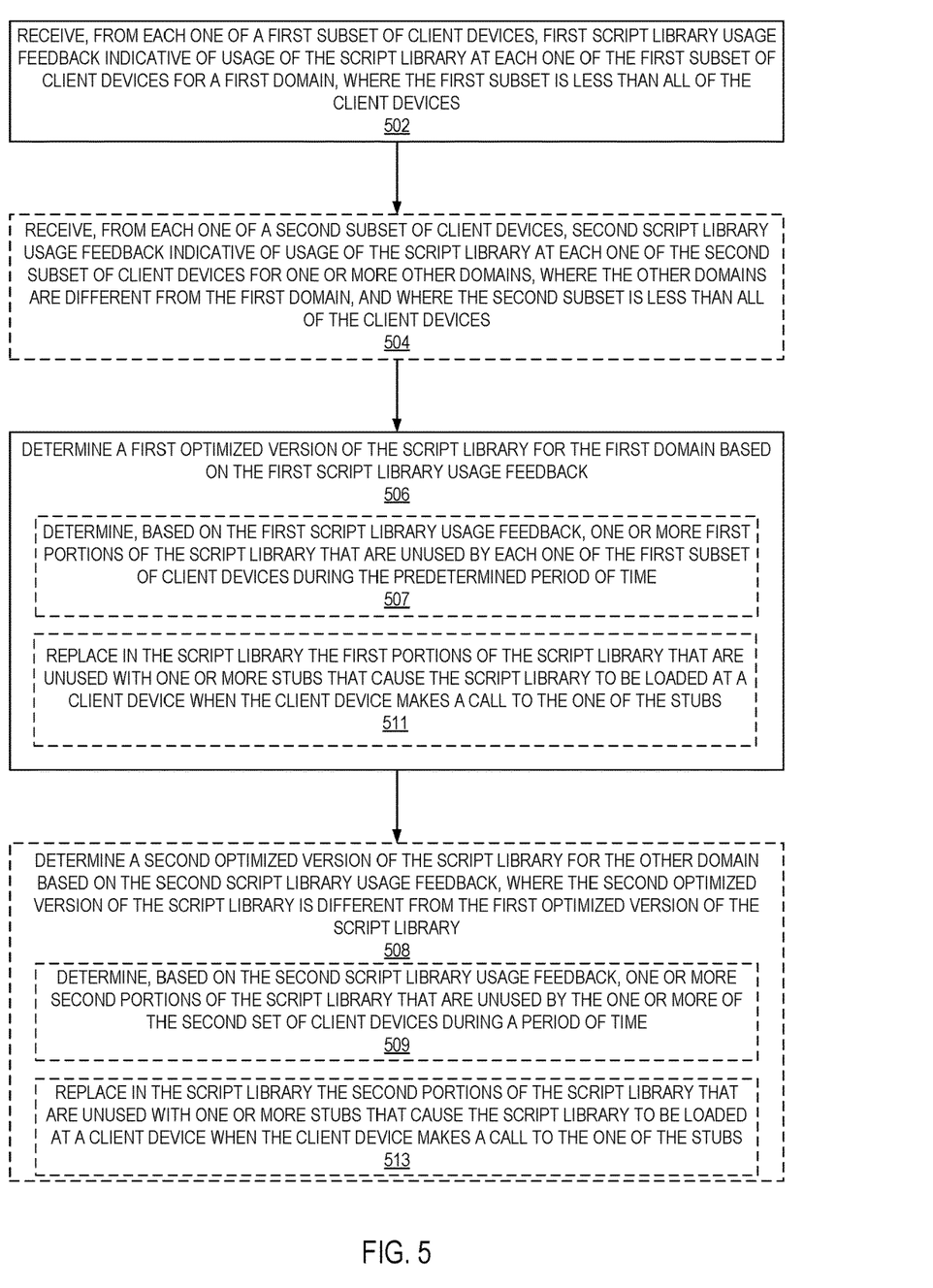
FIG. 5 illustrates a flow diagram of exemplary operations for generating multiple optimized versions of a script library, in accordance with some embodiments.

FIG. 5 illustrates a flow diagram of exemplary operations where different optimized versions of a script library are generated, in accordance with some embodiments. At operation 502, the feedback analyzer and library generator 160 receives, from each one of a first subset of client devices, first script library usage feedback indicative of usage of the script library at each one of the first subset of client devices for a first domain. The first script library usage feedback is received from the first subset of client devices when these client devices are used to access network resources at the first domain and the library is called as a result of this access. The first subset of client device is strictly less than the entire set of client devices requesting a script library during a predetermined period of time.

In some embodiments, the flow of operations further includes operation 504. In other embodiments, operation 504 is skipped. At operation 504, the feedback analyzer and library generator 160 receives, from each one of a second subset of client devices, second script library usage feedback indicative of usage of the script library at each one of the second subset of client devices for one or more other domains, where the other domains are different from the first domain. The second subset of client device is strictly less than the entire set of client devices requesting a script library during a predetermined period of time.

In some embodiments, the flow of operations moves from operation 502 to operation 506. In other embodiments, the flow of operations moves from operation 504 to operation 506. At operation 506, the feedback analyzer and library generator 160 determines a first optimized version of the script library for the first domain based on the first script library usage feedback. In some embodiments, the operation 506 further includes operations 507 and 511. At operation 507, the feedback analyzer and library generator 160 determines, based on the first script library usage feedback, a one or more first portions of the script library that are unused by each one of the first subset of client devices during the predetermined period of time. At operation 511, the first portions of the script library that are unused are replaced with one or more stubs that cause the script library to be loaded at a client device when the client device makes a call to the one of the stubs.

In some embodiments, the flow of operations further includes operation 508. In other embodiments, operation 508 is skipped. At operation 508, the feedback analyzer and library generator 160 determines a second optimized version of the script library for the one or more other domains based on the second script library usage feedback, where the second optimized version of the script library is different from the first optimized version of the script library. In some embodiments, the operation 508 further includes operation 509 at which the feedback analyzer and library generator 160 determines, based on the second script library usage feedback, a second portion of the script library that is unused by the one or more of the second set of client devices during a period of time. In some embodiments, the second optimized version of the script library is generated for a second domain that is different from the first domain. In other embodiments, the second optimized version of the script library is generated for multiple domains that are different from the first domain. The operation 508 further includes operation 513, at which the feedback analyzer and library generator 160 replaces in the script library the second portions of the script library that are unused with one or more stubs that cause the script library to be loaded at a client device when the client device makes a call to the one of the stubs. The stubs enable the optimized version of the script library to be smaller in size than the initial version of the script library. While the embodiments of FIG. 5 discuss an example where at least two different optimized versions of the script library are generated for different domains, in other embodiments, the same optimized version of the script library may be generated for the different domains. In other embodiments, more than two different optimized versions of the script library can be generated without departing from the scope of the present invention.

The embodiments described herein provide a method and system for enabling the generation of optimized version of a script library. The embodiments presented herein decrease network usage between the proxy server serving the script library and the client devices requesting the library, speed up the loading at the client devices of network resources that reference the script library, and improve performance. The use of optimized versions of the script library instead of the initial/original script library also allows for a smaller memory footprint at the client device. For example, the web application running on the client device storing the optimized version of the script library uses a smaller memory footprint than when it stores the initial/original script library.

Figure 6:
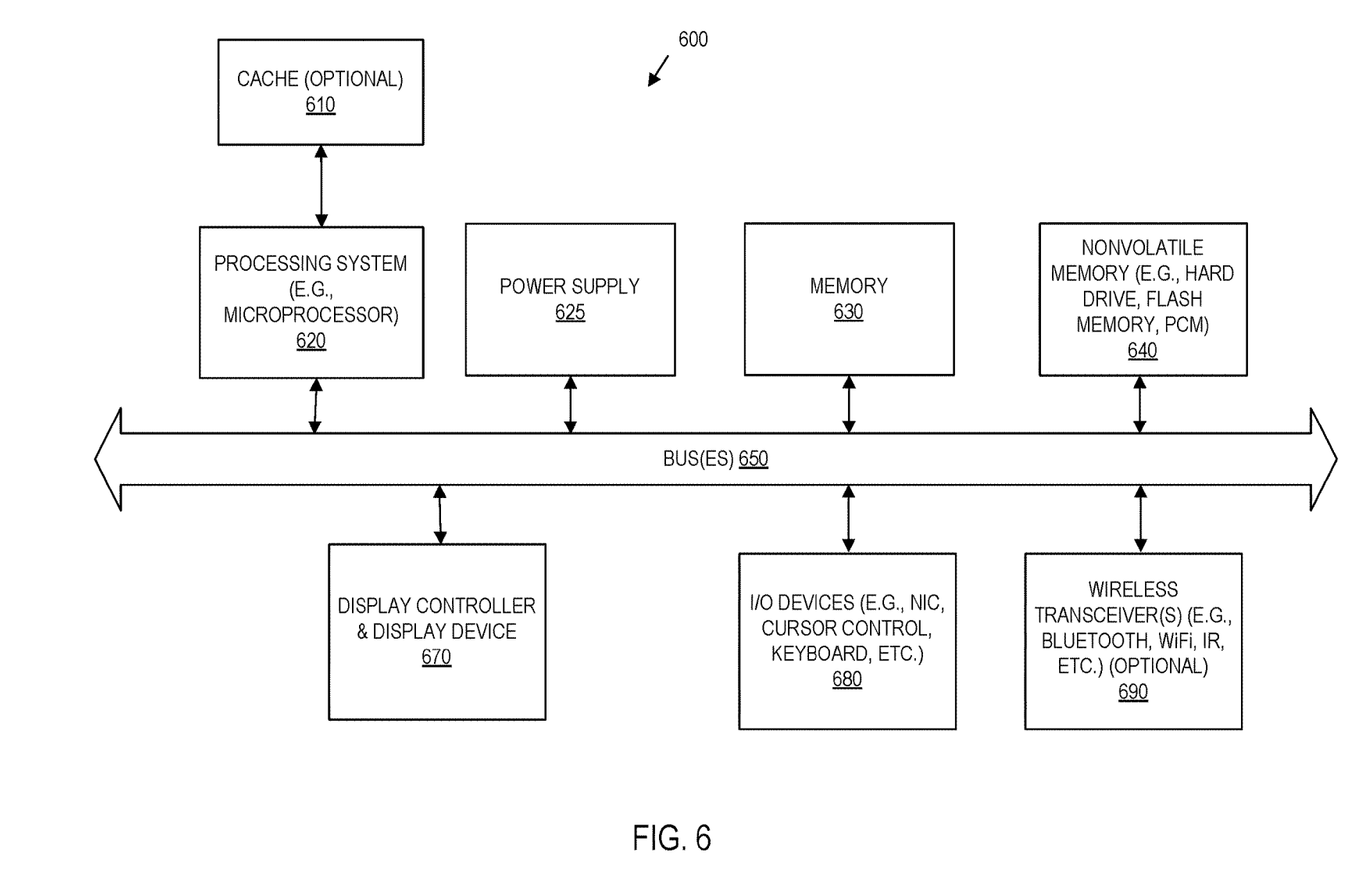
FIG. 6 illustrates a block diagram of an exemplary computer system that can be used for dynamically optimizing a script library in accordance with some embodiments.

FIG. 6 illustrates a block diagram of an exemplary computer system that can be used for dynamically optimizing a script library in accordance with some embodiments. The computer system 600, which is an electronic device, includes the bus(es) 650 which is coupled with the processing system 620, power supply 625, memory 630, and the nonvolatile memory 640 (e.g., a hard drive, flash memory, Phase-Change Memory (PCM), etc.). The bus(es) 650 may be connected to each other through various bridges, controllers, and/or adapters as is well known in the art. The processing system 620 may retrieve instruction(s) from the memory 630 and/or the nonvolatile memory 640, and execute the instructions to perform operations described herein. The bus 650 interconnects the above components together and also interconnects those components to the display controller & display device 670, Input/Output devices 680 (e.g., NIC (Network Interface Card), a cursor control (e.g., mouse, touchscreen, touchpad, etc.), a keyboard, etc.), and the optional wireless transceiver(s) 690 (e.g., Bluetooth, WiFi, Infrared, etc.). In one embodiment, the client device 110A-M, the proxy servers 120A-B, and/or the usage analyzer and library generator 160 can take the form of the computer system 600 and perform the operations described with reference to FIGS. 1A-5. In some embodiments, the usage analyzer and library generator 160 may be part of the same computer system as the proxy server 120A. In other embodiments, the usage analyzer and library generator 160 can be in a computer system that is separate from the computer system of the proxy server 120A.

The techniques shown in the figures can be implemented using code and data stored and executed on one or more electronic devices (e.g., a client device, a proxy server, an origin server, a service server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of dynamic optimization of a script library, the method comprising:
   receiving from each one of a set of one or more client devices a request for a script library;
   transmitting to at least a first one of the set of client devices an instrumented version of the script library, wherein the instrumented version of the script library includes code for tracing execution of the script library;
   receiving, from the at least first one of the set client devices as a result of the execution of the instrumented version of the script library at each one of the at least first one of the set of client devices during a predetermined period of time, script library usage feedback indicative of usage of the script library at the at least first one of the set client devices;
   receiving a second request from a second client device for the script library; and
   transmitting to the second client device an optimized version of the script library instead of the script library, wherein the optimized version of the script library is generated based on the script library usage feedback by removing portions of the script library that are unused by the at least first one of the set client devices.

2. The method of claim 1, wherein the script library usage feedback identifies portions of the script library used during the predetermined period of time at the at least first one of the set of client devices.

3. The method of claim 1, wherein the at least first one of the set of client devices is one of a subset of client devices that are to receive instrumented versions of the script library, wherein the subset is strictly less than the set of client devices, and the method further comprises:
   determining the subset of client devices from the set of client devices that are to receive the instrumented version of the script library;
   wherein the transmitting the instrumented version of the script includes transmitting the instrumented version of the script library to each one of the subset of client devices; and
   wherein the script library usage feedback is indicative of usage of the script library at each one of the subset of client devices and the receiving the script library usage feedback is a result of the execution of the instrumented version of the script library at each one of the subset of client devices during the predetermined period of time.

4. The method of claim 1, wherein the optimized version is determined for a single domain.

5. The method of claim 1, wherein the optimized version is part of a plurality of optimized versions of the script library generated based on script library usage feedback, wherein a first one of the plurality of optimized versions is generated for a first domain, and a second one of the plurality of optimized versions is generated for one or more other domains that are different from the first domain.

6. The method of claim 1, wherein the optimized version of the script library is generated by:
   determining, based on the script library usage feedback, one or more portions of the script library that are unused by the first of the at least one of the set of client devices during the predetermined period of time; and
   replacing in the script library the portions of the script library that are unused with one or more stubs that cause the script library to be loaded at a client device when the client device makes a call to the one of the stubs.

7. A system for dynamic optimization of a script library, the system comprising:
   one or more processors; and
   non-transitory machine-readable storage media coupled with the one or more processors that store instructions that, when executed by the one or more processors, cause said processors to perform the following:
      receive from each one of a set of one or more client devices a request for a script library;
      transmit to at least a first one of the set of client devices an instrumented version of the script library, wherein the instrumented version of the script library includes code for tracing execution of the script library;
      receive, from at least first one of the set client devices as a result of the execution of the instrumented version of the script library at each one of the at least first one of the set of client devices during a predetermined period of time, script library usage feedback indicative of usage of the script library at each one of the at least first one of the set of client devices;
      receive a second request from a second client device for the script library; and
      transmit to the second client device an optimized version of the script library instead of the script library, wherein the optimized version of the script library is generated based on the script library usage feedback by removing portions of the script library that are unused by the at least first one of the set client devices.

8. The system of claim 7, wherein the script library usage feedback identifies portions of the script library used during the predetermined period of time at the at least first one of the set of client devices.

9. The system of claim 7, wherein the at least first one of the set of client devices is one of a subset of client devices that are to receive instrumented versions of the script library, wherein the subset is strictly less than the set of client devices, and wherein said processors are further caused to:
   determine the subset of client devices from the set of client devices that are to receive the instrumented version of the script library;
   wherein to transmit the instrumented version of the script includes to transmit the instrumented version of the script library to each one of the subset of client devices; and
   wherein the script library usage feedback is indicative of usage of the script library at each one of the subset of client devices and to receive the script library usage feedback is a result of the execution of the instrumented version of the script library at each one of the subset of client devices during the predetermined period of time.

10. The system of claim 7, wherein the optimized version is determined for a single domain.

11. The system of claim 7, wherein the optimized version is part of a plurality of optimized version of the script library generated based on script library usage feedback, wherein a first one of the plurality of optimized versions is generated for a first domain, and a second one of the plurality of optimized versions is generated for one or more other domains that are different from the first domain.

12. The system of claim 7, wherein the optimized version of the script library is generated by:
   determining, based on the script library usage feedback, one or more portions of the script library that are unused by the first of the at least one of the set of client devices during the predetermined period of time; and
   replacing in the script library the portions of the script library that are unused with one or more stubs that cause the script library to be loaded at a client device when the client device makes a call to the one of the stubs.

13. A non-transitory computer readable storage medium that stores instructions which when executed by one or more processors cause said processors to perform the following operations for dynamic optimization of a script library, the operations comprising:
   receiving from each one of a set of one or more client devices a request for a script library;
   transmitting to at least a first one of the set of client devices an instrumented version of the script library, wherein the instrumented version of the script library includes code for tracing execution of the script library;
   receiving, from the at least first one of the set client devices as a result of the execution of the instrumented version of the script library at each one of the at least first one of the set of client devices during a predetermined period of time, script library usage feedback indicative of usage of the script library at the at least first one of the set client devices;
   receiving a second request from a second client device for the script library; and transmitting to the second client device an optimized version of the script library instead of the script library, wherein the optimized version of the script library is generated based on the script library usage feedback by removing portions of the script library that are unused by the at least first one of the set client devices.

14. The non-transitory computer readable storage medium of claim 13, wherein the script library usage feedback identifies portions of the script library used during the predetermined period of time at the at least first one of the set of client devices.

15. The non-transitory computer readable storage medium of claim 13, wherein the at least first one of the set of client devices is one of a subset of client devices that are to receive instrumented versions of the script library, wherein the subset is strictly less than the set of client devices, and the operations further comprise:
  determining the subset of client devices from the set of client devices that are to receive the instrumented version of the script library;
  wherein the transmitting the instrumented version of the script includes transmitting the instrumented version of the script library to each one of the subset of client devices; and
  wherein the script library usage feedback is indicative of usage of the script library at each one of the subset of client devices and the receiving the script library usage feedback is a result of the execution of the instrumented version of the script library at each one of the subset of client devices during the predetermined period of time.

16. The non-transitory computer readable storage medium of claim 13, wherein the optimized version is determined for a single domain.

17. The non-transitory computer readable storage medium of claim 13, wherein the optimized version is part of a plurality of optimized versions of the script library generated based on script library usage feedback, wherein a first one of the plurality of optimized versions is generated for a first domain, and a second one of the plurality of optimized versions is generated for one or more other domains that are different from the first domain.

18. The non-transitory computer readable storage medium of claim 13, wherein the optimized version of the script library is generated by:
  determining, based on the script library usage feedback, one or more portions of the script library that are unused by the first of the at least one of the set of client devices during the predetermined period of time; and
  replacing in the script library the portions of the script library that are unused with one or more stubs that cause the script library to be loaded at a client device when the client device makes a call to the one of the stubs.

* * * * *